Fig. 1.

May 8, 1951 H. C. LAWRENCE, JR., ET AL 2,551,681
DIRECT READING LORAN NAVIGATION SYSTEM
Filed Feb. 26, 1949 5 Sheets-Sheet 3

Fig.3.

INVENTORS
HOWARD C. LAWRENCE JR.
& ROBERT R. FREAS, JR.
BY
J. L. Whittaker
ATTORNEY May 8, 1951    H. C. LAWRENCE, JR., ET AL    2,551,681
DIRECT READING LORAN NAVIGATION SYSTEM
Filed Feb. 26, 1949    5 Sheets-Sheet 4

INVENTORS
HOWARD C. LAWRENCE, JR.
& ROBERT R. FREAS, JR.
BY
ATTORNEY

Patented May 8, 1951

2,551,681

UNITED STATES PATENT OFFICE 2,551,681

DIRECT READING LORAN NAVIGATION SYSTEM

Howard C. Lawrence, Jr., Haddonfield, N. J., and Robert R. Freas, Jr., Jermyn, Pa., assignors to Radio Corporation of America, a corporation of Delaware Application February 26, 1949, Serial No. 78,482

13 Claims. (Cl. 343—103)

Our invention relates to radio navigation systems of the "loran" type utilizing the time difference in the propagation of radio pulses from synchronized ground stations, and to improved and simplified counter systems designed to produce pulses which have selected repetition rates and which are delayed selected amounts.

The present invention is an improvement on the system described and claimed in application Serial 33,846, filed June 18, 1948, Patent No. 2,523,244, granted September 19, 1950, in the name of John D. Woodward. In the said Woodward system, a crystal oscillator operating at one megacycle per second feeds into a chain of decade counters, the first decade counter being referred to as a one megacycle counter.

It has been found that in a system of the type described by Woodward, great care must be taken in the design to make a one megacycle counter operate satisfactorily. Unless such care is taken, difficulty will be encountered in the resetting operation of the counter. Also, unless such care is taken the coincidence tubes or circuits may not operate properly because of an insufficiently steep wave front on the pulses that the one megacycle counter output pulses must set on at the coincidence circuits.

In the present system, just as in the Woodward system, it is desired to obtain pulse delays in one microsecond steps or intervals. In the Woodward system this is accomplished by means of the one megacycle counter. According to the present invention, this is accomplished by means of a tapped delay line, for example, to which delayed pulses (delayed to within nine microseconds or less short of the desired delay) are applied, the taps along the delay line being at one microsecond intervals. Thus, the one megacycle counter stage is eliminated along with all the difficulties in making it operate satisfactorily. The crystal oscillator is now operated at 100 kilocycles per second instead of being operated at one megacycle per second.

Also, by employing the present invention, the system may be made more compact (1) because stray capacities in the wiring, etc. cause less trouble than when a one megacycle counter is employed, (2) because certain of the tubes may be made smaller since they do not have to supply power to lower impedance resistors to obtain pulses of very steep wave front, and (3) because a smaller number of tubes is required.

Navigation systems of the "loran" type employ pairs of synchronized ground transmitting stations that emit radio pulses having a fixed time relation. Each pair of ground stations preferably transmits pulses at an assigned individual repetition rate for the purpose of station selection. The pulses are broadcast so that they may be received by means of equipment located in the aircrafts or ships whose positions are to be determined. By means of the receiving equipment, the operator on the craft determines the time difference between the pulses from the two transmitter stations of one pair as they arrive at the receiver. Since the radio pulses travel from the ground transmitters to the receiver at a known propagation rate (i. e., at the velocity of light), it is known that the position of the craft is at some point on a line corresponding to the time difference reading. By obtaining the time difference reading from a second pair of ground stations, a second line corresponding to the second time difference reading is obtained, and the intersect point of the two lines is the position of the craft. Special maps having the "time difference" or "loran" lines printed thereon for the several pairs of ground stations are provided for use with the navigation system.

In order to measure the time difference in the arrival of successive pulses from a pair of ground stations, the receiving equipment is arranged to generate pulses at selected repetition rates. The pulses may be adjusted to have a definite time relation to time of arrival of the ground station pulses and are provided for the purpose of driving or synchronizing cathode-ray deflecting circuits. The deflecting circuits produce cathode-ray sweep traces on which the received ground station pulses are displayed. According to the present invention, these selected-repetition-rate and adjustably-delayed pulses are obtained from a system that, as indicated heretofore, is an improvement on the system of counters and switching described and claimed in the above-mentioned Woodward application.

For the purpose of selecting a particular pair of ground stations, the operator selects the particular pulse repetition rate for the driving or synchronizing pulses corresponding to the repetition period of the pulses transmitted from said pair whereby the deflecting circuits may be synchronized with the received pulses from the selected pair of ground stations. This repetition rate selection is accomplished by adjusting the repetition-rate-determining switches of a chain of counters as described in said Woodward application and as described hereinafter. Thus a particular pair of ground stations is selected at the receiver apparatus by setting the said counter switches to preselected positions. This preferably is done by turning a single station selection knob operating the several counter switches. Assuming the station selection switches are ganged, the station selection knob is turned to a position indicated on the receiver panel for obtaining sweep synchronizing pulses having the same repetition period as that of the pulses being transmitted from the selected pair of ground stations. Now the received pulses from the selected pair of ground stations can be made to appear stationary on the cathode-ray sweep or trace whereas those received from the other pairs of ground stations will move along the same trace.

The pulses from the two transmitter stations of a selected pair will be referred to as A and B pulses, respectively, and the B pulse is identified in the present system as the pulse that occurs after or follows the mid-point of the other pulse period. In operation, the A and B pulses are displayed, respectively, first on two slow-sweep cathode-ray traces and then on two fast-sweep cathode-ray traces, thereby enabling the operator to obtain an alignment of the A and B pulses by adjusting another set of switches, referred to as delay-determining switches, so that the time difference between the pulses driving or synchronizing the cathode-ray deflecting circuits equals exactly the time difference between A and B pulses.

In accordance with the present invention, certain of said delay-determining switches are switches connected to said chain of counters just as described in said Woodward application, for example, but at least one of the delay-determining switches is connected to a tapped delay line or the like instead.

It will be noted that the chain of counters has two sets of switches connected to it, one for determining the repetition rate and the other for determining in part the amount a pulse is delayed. The action of each is independent of the action of the other.

The reason for employing a delay means with delay-determining switching connected thereto is that it simplifies the equipment and, what is more important, its use makes it possible to begin the counter chain with a lower frequency decade counter unit and thus avoid serious difficulties encountered in operating such a unit at a very high frequency.

The adjustment for the display and alignment of the A and B pulses is accomplished by first setting the A pulse at the left end of the upper slow-sweep trace, when the receiving apparatus is switched to an operating position marked #1. The B pulse will then appear on the lower cathode-ray trace and a variable index marker may now be located under the B pulse, this being done by adjusting the several delay switches to delay the variable index marker the correct amount. The apparatus is then switched to a #2 fast-sweep operation position so that the A and B pulses appear on two fast-sweep traces, respectively. The starting time of the fast-sweep trace on which the B pulse appears always coincides with the start of said variable index marker as determined by the delay switches, while the starting time of the fast-sweep trace on which the A pulse appears, coincides with the start of the slow-sweep trace. Therefore, by a more exact adjustment of the delay switches, the adjustable fast-sweep wave is caused to start at the proper time to bring the A and B pulses into alignment. In order to insure exact alignment, the A and B pulses should be made to have the same amplitude, and an amplitude balance control circuit is provided for this purpose. After these adjustments have been made, the time difference between the starts of the fast-sweeps will exactly equal the time difference between the A and B pulses from the transmitters, and this time difference can be read directly from the settings of the delay switches.

The counter chain and switching system described in this application is not limited to use in a navigation system but, rather, is of general application where adjustably-delayed signals are desired and, especially, where it is also desired to select different repetition rates for the signals.

In the specific example herein described as applied to a navigation system, the counter chain comprises three decade counters (rather than four as shown in the Woodward application) that divide by 10 followed by a frequency divider that divides by 4. The first stage of the "divide by 4" unit is a binary counter (a multivibrator) that is the last stage, strictly speaking, of the counter chain. The second multivibrator of the "divide by 4" unit has no reset pulse applied to it. The decade counters are preferably of the general type described in application Serial No. 580,446 filed March 1, 1945 in the name of Igor E. Grosdoff, now Patent No. 2,521,788 issued September 12, 1950. More specifically, the counter and counter switching combination utilizes principles described in application Serial No. 719,035 filed December 28, 1946 in the name of Charles J. Young now Patent No. 2,490,500 issued December 6, 1949, but, as set forth in said Woodward application, includes improvements over and additions to the combination disclosed by Young.

In accordance with the present example of the invention, the delayed pulses having a delay that is determined by the settings of the delay-determining switches are applied to a delay line and are taken off taps on the delay line through a delay-determining switch for obtaining delays in steps of one microsecond.

An object of the present invention is to provide an improved method of and means for determining the time difference between electrical pulses.

A further object of the invention is to provide improved receiving equipment for a radio navigation system of the type utilizing the propagation of radio pulses from pairs of synchronized ground stations.

A still further object of the invention is to provide an improved method of and means for indicating the time difference between radio pulses transmitted from synchronized ground stations.

A still further object of the invention is to provide an improved method of and means for obtaining a direct reading of the time difference between radio pulses transmitted from synchronized ground stations.

A still further object of the invention is to provide an improved means for obtaining signals that are delayed selected amounts.

A still further object of the invention is to provide an improved method of and means for obtaining signals of selected repetition rates that are delayed selected amounts.

A still further object of the invention is to provide an improved method of and means for producing pulses that recur at selected repetition rates and that may be adjusted in timing or phase.

Other objects, features and advantages of the invention will be apparent from the following description taken in connection with the accompanying drawings in which.

In the several figures, similar parts are indicated by similar reference characters.

THE COUNTER CHAIN AND ASSOCIATED REPETITION RATE SWITCHES AND DELAY SWITCHES

Figure 1:
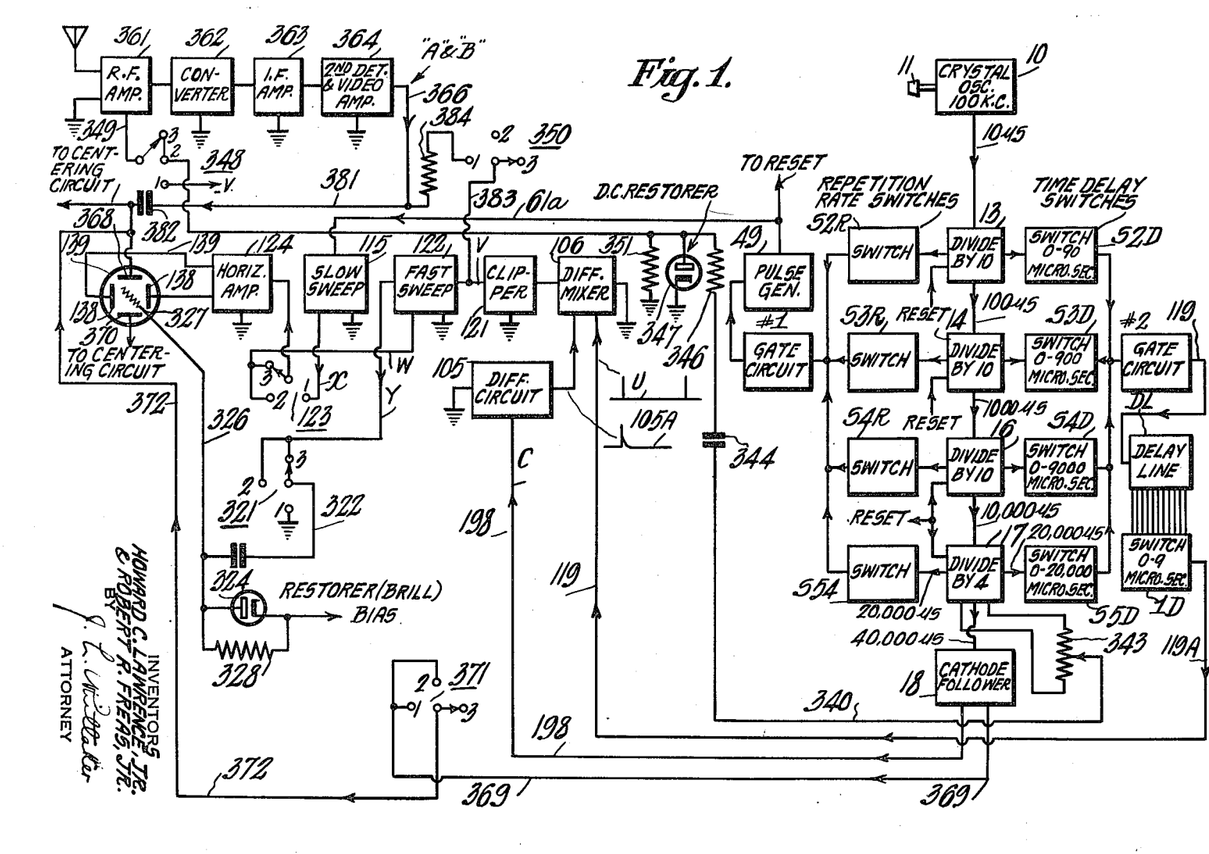
Figure 1 is a block and circuit diagram of navigation receiving apparatus designed in accordance with one embodiment of the invention, Figures 2 and 3, to be placed side by side, are block and circuit diagrams of the counter and the associated repetition rate switching and delay switching shown in block in Figure 1.
Figure 2:
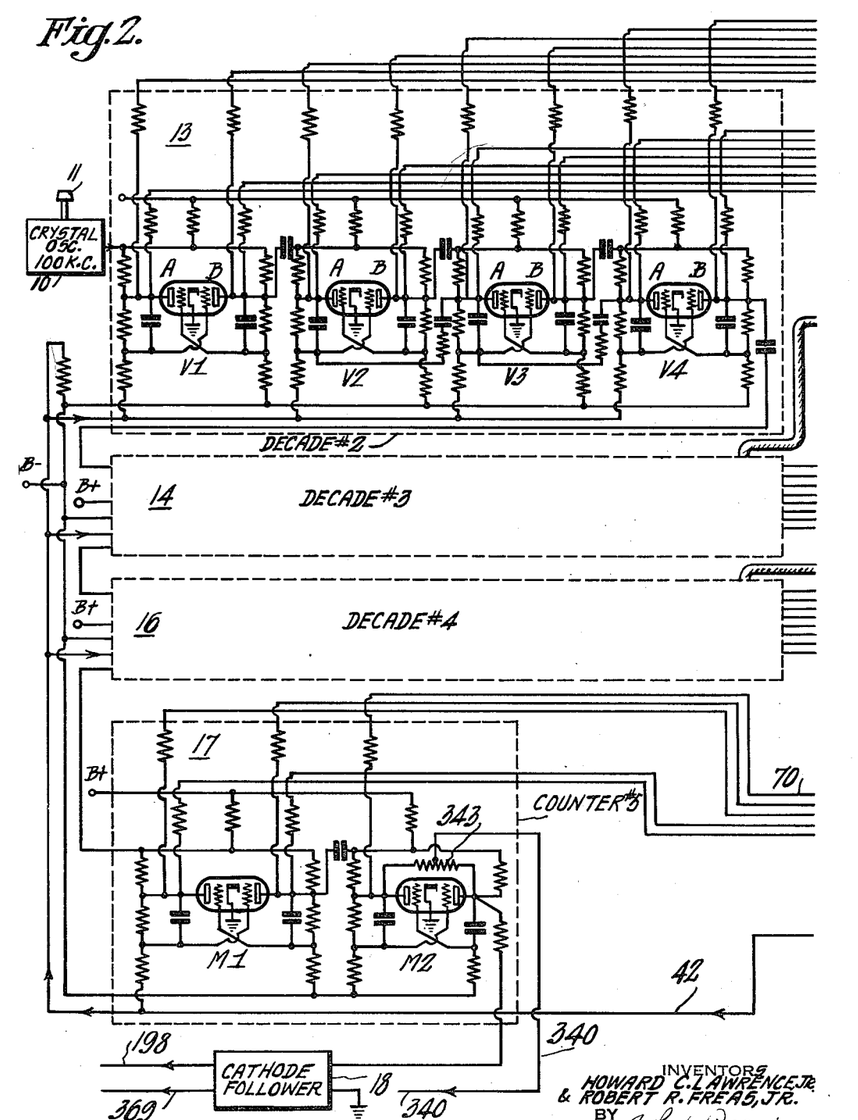
Figure 3:
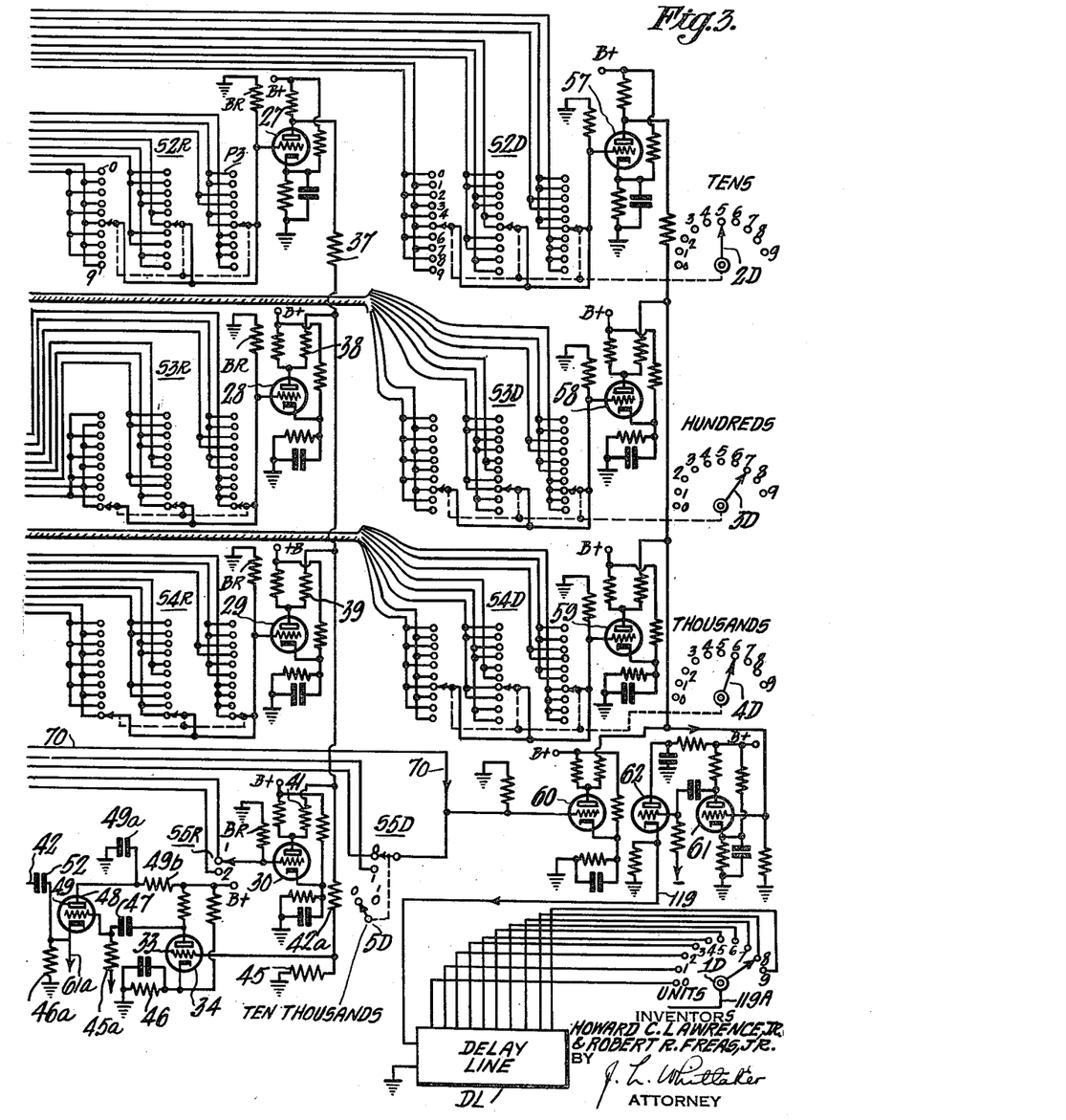

Referring to the navigation receiving apparatus shown in Figures 1, 2 and 3, the pulse-producing system comprises a crystal oscillator 10 that produces a sine wave voltage of stable frequency which in the example illustrated is 100 kilocycles per second, the repetition period being 10 microseconds. The frequency of the crystal oscillator output may be increased or decreased slightly by a manual adjustment as indicated at the control knob 11 for obtaining a right or left drift of a received pulse on a cathode-ray sweep trace.

The crystal oscillator 10 drives a decade counter 13 to produce periodic pulses which recur at the rate of 10 kilocycles per second. The repetition period or time interval between successive pulses is, therefore, 100 microseconds.

The frequency of the 100 μs pulses is divided by 10 by means of a second decade counter 14 to produce 1000 μs pulses. The frequency of the 1000 μs pulses is divided by 10 by means of a third decade 16 to produce 10,000 μs pulses, and the frequency of these is divided by 4 by means of a frequency divider or counter 17 to produce 40,000 μs pulses. As explained hereinafter, the decades and the first stage of the divider 17 comprise a counter chain. The output of divider 17 is in the form of a square wave having the repetition period of 40,000 μs. This square wave is always symmetrical regardless of the repetition rate since the reset pulses are not applied to the second and last stage of the divider 17 as will be understood from the later detailed description. The square output wave is passed through a cathode follower tube 18 and from it are obtained a vertical separation wave and, by means of a shaping circuit, a pulse for driving or synchronizing the fixed horizontal fast-sweep deflection as explained hereinafter.

A variable index marker pulse, which is obtained by way of a gate circuit No. 2, a delay line DL, and a switch 1D, is adjustable in timing or delay whereby it may be shifted along the sweep trace when a slow-sweep is used and whereby it may be utilized to trigger the adjustable fast-sweep when the fast-sweep is used.

The amount the variable index marker pulse is delayed is determined by the setting of time delay switches 1D, S2D, S3D, S4D, and S5D. With the exception of switch 1D, these switches, as shown in Figure 3, are multi-pole, multi-contact switches that are connected to the several anodes of the multivibrator tubes in the counters. The switch 1D is connected to taps on the delay line DL for obtaining a delay in one microsecond units as explained hereinafter.

The repetition rate of the pulse from gate No. 2, as well as that of the other pulses taken off the counter chain, including the pulse taken off a gate circuit No. 1, may be varied for the purpose of station selection by means of repetition rate switches S2R, S3R, S4R, and S5R which are similar to the delay switches S2D, etc. and which are connected to the anodes of the counter tubes in a similar fashion. Pulses taken off the switches S2R, etc. are passed through the gate circuit No. 1 and are supplied to a pulse generator 49 which may comprise a Thyratron as explained hereinafter.

The pulse output of gate No. 1 is also applied to each of the counters for resetting them as indicated in Figure 1 and as will be explained in the more detailed description with reference to Figures 2 and 3.

A detailed description of Figures 2 and 3 will be given later, but first the other parts of the navigation system will be explained. In the example being described, it will be assumed that the first pair of ground stations transmit the A pulses with a repetition period of 40,000 μs and transmit the B pulses with a like repetition period; that the second pair of ground stations transmit A and B pulses having a repetition period of 39,900 μs; that the third pair transmits 39,800 μs pulses; that the fourth pair transmits 39,700 μs pulses, etc. It is apparent that for station selection at the receiving apparatus, the operator must be able to select corresponding repetition periods for the output pulses of the counter system which control the cathode-ray deflection cycle; namely, periods of 40,000 μs; 39,900 μs; 39,800 μs; 39,700 μs; 39,600 μs; etc.

However, it may be preferred to employ a different group of repetition periods than the group of 40,000 μs, 39,900 μs, etc. assumed above. For example, repetition periods of 30,000 μs, 29,900 μs, etc. may be employed. Or, as another example, repetition periods of 50,000 μs, 49,900 μs, etc. may be employed.

CATHODE RAY TRACE PRESENTATION

At this point, it may be well to give a description of the operation of the receiving apparatus shown in Figure 1 with particular reference to the cathode-ray deflecting waves and the cathode-ray tube presentation.

Figure 5:
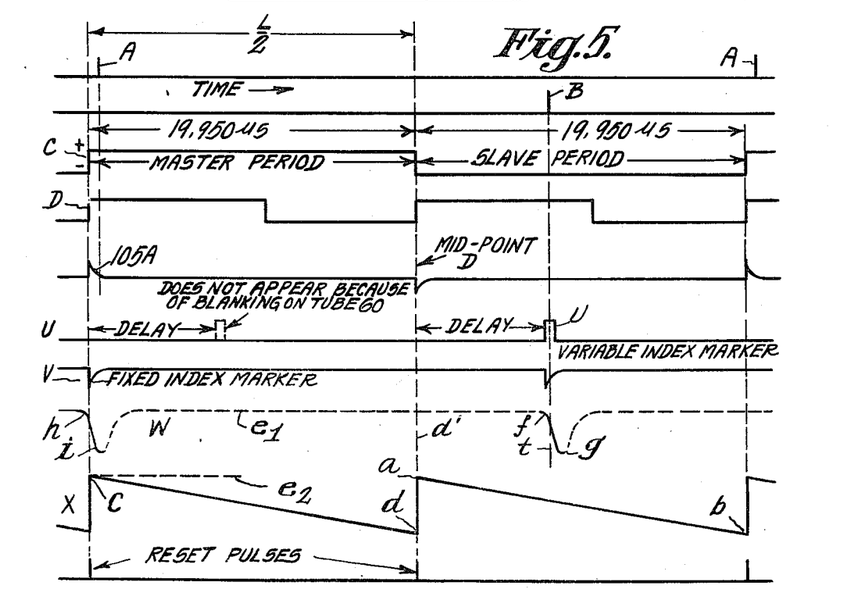
Figure 5 is a group of graphs which are referred to in explaining the operation of the navigation system shown in Figure 1.

In Figure 5, the graphs X and W show the wave shapes of the slow-sweep and fast-sweep horizontal deflecting waves, respectively, for obtaining the desired cathode-ray traces. The wave V comprises a pair of recurring pulses, the second of which (referred to as the variable index marker) is adjustable in time and determines the starting time $t$ of the wave $f$—$g$ of the graph W. The starting time $t$ of the variable index marker in relation to the fixed index marker may be adjusted by adjusting the switches ID, S2D, etc. (Figures 1 and 3), as will be explained hereinafter, for aligning the A and B pulses. By means of ganged function switches, three switching positions identified as positions #1, #2 and #3 are used successively in aligning the A and B pulses. It will be understood that while the pulses A and B and their corresponding fast-sweep traces appear alternately on the cathode-ray tube screen, they appear to the eye to occur simultaneously because of persistence of vision, lag of phosphorescence of the screen or both.

As shown in Figure 5, the B pulse is the one that occurs after the mid-point of the A pulse period, and consequently the time interval, which elapses between the occurrence of a B pulse and the succeeding A pulse will be less than one-half pulse interval. As will be seen in Figure 5, the start of one fast-sweep ($h$—$i$) coincides with the start of a slow trace, while the start of the other fast-sweep ($f$—$g$) coincides with the variable index marker.

As already explained, a momentary change of the recurrence rate will change the location of the pulses on the trace by "drifting" them along the trace. Specifically, it is possible for the operator to locate the A pulse at the left side of the upper slow trace, which in turn will cause the B pulse to fall on the lower trace, and the variable index marker may be made to coincide with the B pulse. Therefore, when the function switches are turned to position #2, the A pulse will occur during the trace described by the fixed fast-sweep deflecting wave $h$—$i$, while the B pulse will occur during the trace described by the variable fast-sweep deflecting wave $f$—$g$.

A finer adjustment will permit the operator to align the A and B pulses so that the time elapsed between the start of the respective fast-sweeps and the corresponding pulses are equal and occurs during the expanded parts of the traces, thereby providing good accuracy for determining the time delay.

In the present system, after the A and B pulses have been aligned with the receiver switched successively to operating positions #1, #2 and #3, the desired time difference or time interval is read off the delay switches ID, S2D, S3D, S4D, and S5D (Figures 1 and 3) which indicate, respectively, microseconds in units, tens, hundreds, thousands and multiples of ten thousand. The time interval thus obtained is the amount that the starting time $t$ of the variable index marker has been delayed in time with respect to the mid-period $d'$ (Figure 5) of the deflecting wave cycle in order to align the A and B pulses.

It may be noted that the upper fast trace $h$—$i$ (illustrated in Figure 8) is produced by the first fast-sweep $h$—$i$ of the deflecting wave W. The lower fast trace $f$—$g$ (Figure 8) is produced by the second fast-sweep wave $f$—$g$ of the deflecting wave W.

GENERAL DESCRIPTION OF CATHODE RAY TRACE PRODUCING CIRCUITS

Referring to Figure 1 and to the graphs of Figure 5, the output of the pulse generator 49 is supplied over a conductor 61a to a slow-sweep deflecting circuit 115 for producing a sawtooth voltage wave X.

The output of the divider 17 is a rectangular voltage wave which appears unchanged at the output of a cathode-follower tube 18 as the wave C.

To produce the fast-sweep wave $h$—$i$ of deflecting wave W (Figure 5), the wave C is supplied over a conductor 198 to a differentiating circuit 105 to produce a pulse 105A. The pulse 105A is also utilized as the fixed index marker of the wave V.

The circuit for producing the variable index marker of wave V comprises the counter chain, the delay line DL and the associated delay switching, the said marker being obtained from the adjustably delayed pulse U taken from the delay line DL by way of the switch ID. The delay line DL has delayed pulses supplied to it from the gate No. 2 as described hereinafter, the delay line providing the final precise delay in steps of one microsecond units. It is the wave U that controls the timing of the adjustable fast-sweep portion $f$—$g$ of wave W.

The delayed pulse U is supplied over a conductor 119A to the mixer 106. The mixed waves U and 105A pass through a clipper 121 and appear as the wave V which drives the fast-sweep deflecting circuit 122 to produce the wave W.

When the system is in the No. 1 operating position, the fixed and adjustable index marker pulses of the wave V are applied to the vertical deflecting plate 368 of the indicator tube 139 through a lead 383, a switch 350, a resistor 384, and a lead 381.

Description of mixer 106, etc.

Figures 4, 7, 8, 9, 10, 11, 12:
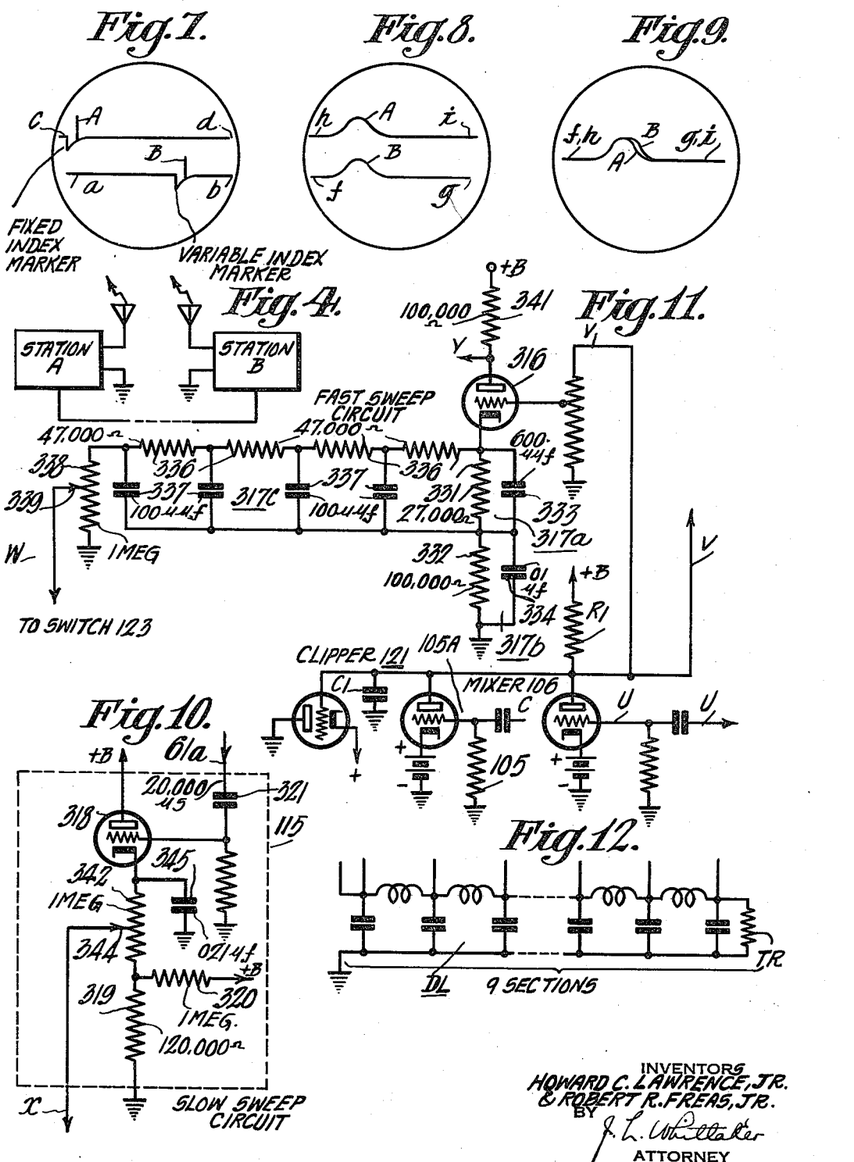
Figure 4 is a block diagram representing one pair of ground radio transmitter stations of the navigation system which transmit A and B pulses, respectively.
Figure 7 is a view of the slow-sweep cathode-ray traces appearing on the screen end of the cathode-ray indicator tube that is included in the apparatus of Figure 1 and of the received pulses A and B as they appear on the traces when they are "aligned,"
Figure 8 is a view of the fast-sweep cathode-ray traces on the cathode-ray tube indicator and of the received pulses A and B as they appear on the two fast-sweep traces, respectively, during the next step in obtaining more exact alignment of the A and B pulses.
Figure 9 is a view showing the fast-sweep traces of Figure 8 superimposed or collapsed for the final alignment step and showing the A and B pulses exactly aligned and superimposed.
Figures 10 and 11 are circuit diagrams of the horizontal deflecting slow-sweep and fast-sweep circuits, respectively, employed in the system of Figure 1.
Figure 12 is a circuit diagram of the delay line shown in block in Figure 3.

Referring to Figures 1 and 11, the mixer circuit 106 and the clipping circuit 121 function to clip off the negative pulses of the wave 105A and to mix the remaining clipped positive pulses with the pulses U. Thus, the wave V is obtained at the output of the clipper-mixer combination. The mixer 106, which may consist of two vacuum tubes having a common anode resistor as shown in Figure 11, reverses the polarity of the pulses. The waves in the plate circuit of the mixer 106 are of equal amplitude due to operation of the tubes in a condition where grid and plate voltage approach equal amplitude. The width of the applied pulses U and 105A is short compared to that of the plate pulses, the width of the latter being controlled by a capacitor-resistor combination in the plate circuit and therefore being independent of the width of the incoming wave. This capacitor-resistor combination comprises a capacitor C1 and the plate resistor R1.

The wave V is supplied to the fast-sweep deflecting circuit 122 shown in detail in Figure 11 and described hereinafter. The narrow negative pulses of wave V produce the fast-sweep wave W having the useful deflecting portions $h$—$i$ and $f$—$g$. The deflecting waves W and X are applied from the circuits 122 and 115 through a wave-selecting switch 123 and through a horizontal deflecting amplifier 124 to the horizontal deflecting plates 138 of the cathode-ray indicator tube 139. As described in copending application Serial No. 589,320, now Patent No. 2,445,361, issued July 20, 1948, filed April 20, 1945 in the names of Garrard Mountjoy, George D. Hulst, Jr. and Earl Schoenfeld and entitled Radio Navigation System, the horizontal deflecting amplifier 124 may be provided with a switch (not shown) for changing the bias on the amplifier tubes when the function switch is changed from the slow-sweep position to the fast-sweep position and vice versa, thereby insuring optimum efficiency and undistorted gain from the amplifier tubes.

The switch 123, which is one of the function switches, has three contact points and three corresponding switch positions, referred to as operating positions, which are identified, reading clockwise, as positions #1, #2, and #3.

There are several other operation position or function switches, described hereinafter, that likewise have these three switch positions and which are ganged with the switch 123.

Switch 123, when in operation position #1, functions to apply the slow-sweep wave X to the horizontal deflecting plates 138 and, when in operation positions #2 and #3, functions to apply the fast-sweep wave W to the deflecting plates 138.

The fast-sweep deflecting circuit 122 that is driven by the wave V (comprising the fixed and variable marker pulses) to produce the fast-sweep wave W will not be described with reference to Figure 11.

The fast-sweep circuit

Referring more specifically to the circuit 122 for producing the fast-sweep wave W, as shown in Figure 11, the circuit comprises a vacuum tube 316 and a pulse-shaping network that comprises two sections consisting of cathode resistors 331 and 332 shunted by capacitors 333 and 334, respectively, identified as network sections 317a and 317b. The shaping network further comprises a delay line section 317c comprising series resistors 336 and shunt capacitors 337 connected across the cathode resistor 331 and terminated in a resistor 338 and in the cathode resistor 332. The fast-sweep wave W is taken off the resistor 338 through an adjustable tap 339, the setting of which determines the amplitude of the wave W.

In operation, the capacitors of the network sections 317a and 317b are charged through the anode resistor 341 and the tube 316 to a certain voltage level between successive pulses of the wave V to bring the tap 339 to the voltage $e_1$ (Figure 5). Upon the occurrence of each negative pulse of the wave V, the tube 316 is driven to cut-off and the capacitors 333 and 334 discharge through the resistors 331 and 332, respectively. The section 317a comprising capacitor 333 and resistor 331 has a fast time constant whereby the discharge of capacitor 333 produces a voltage of steep slope across resistor 331. The section 317a comprising capacitor 334 and resistor 332 has a slower time constant whereby the discharge of capacitor 334 produces a voltage of less slope across resistor 332. These two voltages of different slopes appear at the tap 339 as the sum of the two voltages with the voltage of the steeper slope slightly delayed by the delay network section 317c.

The wave form of the wave W following the said slight delay is approximately logarithmic. It should be understood that the fast-sweep wave W need not be of the wave form described and, in fact, may be linear.

The above-described fast-sweep deflecting circuit is described and claimed in application Serial No. 583,255, now Patent No. 2,463,969, issued March 8, 1949, filed March 17, 1945 in the name of George D. Hulst, Jr. and entitled Cathode Ray Deflection Circuit.

As previously noted, the starting time $t$ of the fast-sweep wave $f$—$g$ is determined by the adjustment of the pulse U (and in turn by the variable index marker of wave V) whereby the start of the wave $f$—$g$ may be made to precede the received B pulse by the same amount that the start of the wave $h$—$i$ precedes the received A pulse, this being the condition of alignment of the A and B pulses. It should also be noted that the wave $f$—$g$ is identical with the wave $h$—$i$ whereby exact alignment of the A and B pulses on the cathode-ray traces is obtained (as shown in Figure 9) when the above-described timing relation exists.

An improved fast-sweep circuit described and claimed in copending application Serial No. 674,184, now Patent No. 2,449,169, issued September 14, 1948, filed June 4, 1946 in the names of Paul F. J. Holst and Loren R. Kirkwood and entitled Deflecting Circuits, may be employed if desired.

The slow-sweep circuit

Referring more specifically to the slow-sweep deflecting circuit 115, as shown in Figure 10, it comprises a vacuum tube 318 and a network in the cathode circuit that comprises a cathode resistor 342 that has an adjustable tap 344 thereon and which is shunted by a capacitor 345. Positive bias is applied to the cathode of the tube 318 by connecting the lower end of cathode resistor 342 to the junction point of a pair of bleeder resistors 319 and 320. This prevents the tube 318 from drawing current at the end of the sawtooth cycle so that flattening of the sawtooth wave is avoided. The operation is as follows: Each time one of the positive 20,000 $\mu s$ pulses from the lead 61a is supplied to the grid of the tube 318 by way of a coupling capacitor 321, the capacitor 345 is charged suddenly from the anode voltage supply through the tube 318 to a certain voltage level to bring the tap 344 to the voltage level $e_2$ (Figure 5). At the end of each positive pulse, the capacitor 345 discharges slowly through the resistors 342 and 319 thus producing successively the slow-sweep sawtooth wave portion $a$—$b$ and the sawtooth wave portion $c$—$d$ at the tap 344.

In Figures 10 and 11, the values of certain circuit elements have been indicated, merely by way of example, in ohms, megohms, microfarads and micro-microfarads.

THE RADIO RECEIVER

The A and B pulses from a pair of ground stations (Figure 4) are received by a radio receiver of the superheterodyne type comprising a radio frequency amplifier indicated at 361, a converter 362, an I.-F. amplifier 363 and a second detector and video frequency amplifier 364. The A and B pulses are supplied with positive polarity over a conductor 366, a conductor 381 and a capacitor 382 to the upper vertical deflecting plate 368. Thus, the A and B pulses may be made to appear, as shown in Figures 7, 8 and 9, on the horizontal cathode-ray traces. The A and B pulses are made to appear with equal amplitude on the cathode-ray tube screen by employing a differential gain control circuit described hereinafter.

SLOW-SWEEP AND FAST-SWEEP TRACE SEPARATION

The slow-sweep traces a—b and c—d are separated as illustrated in Figure 7 while the receiver is on the #1 operation position by means of the rectangular wave C (Figure 5) supplied from the cathode follower tube 18 (Figure 1) over a conductor 369 to the #1 contact point of a trace separation switch 371, and over a conductor 372 to the upper deflecting plate 368 of the cathode-ray tube 139. Thus, the portion of the wave C, which is positive as it appears on the upper plate 368, holds the cathode-ray deflection up a certain amount during the occurrence of the slow-sweep deflecting wave c—d.

The fast-sweep traces f—g and h—i are separated as illustrated in Figure 8 during the #2 operation position also by means of the rectangular wave C.

FAST-SWEEP BLANKING

Blanking is provided so that only the traces f—g and h—i appear on the cathode-ray screen when in the #2 and #3 fast-sweep operating positions. This blanking is provided by means of the negative portions of the wave Y as it appears on the anode of the tube 316 (Figure 11) of the fast-sweep deflecting circuit 122. The wave Y is supplied from the anode of tube 316 to the #2 and #3 contact points of a switch 321 whereby in the #2 and #3 operation positions, this wave is supplied over conductors 322 and 326 to the grid 327 of the cathode-ray tube 139.

TRACE BRILLIANCE CONTROL

The diode 324 is provided to control the brilliance of the traces on the cathode-ray tube screen by preventing changes in bias on the cathode-ray tube grid 327 due to the application of blanking pulses. A leak resistor 328 is connected across the diode 324 and the cathode of the diode 324 is connected to a variable bias voltage source (not shown).

In operation, during the periods that the blanking waves are positive at the anode of the diode 324, the impedance of the diode 324 is very low so that its anode is practically at the bias potential of its cathode. Thus, regardless of the form of the blanking wave and regardless of whether any blanking wave is being applied, the voltage on the grid 327 of the cathode-ray tube during the cathode-ray sweeps is substantially the voltage on the cathode of the diode 324.

DIFFERENTIAL GAIN CONTROL CIRCUIT

A differential gain control circuit for the R.-F. amplifier 361 of the radio receiver preferably is provided, as shown in Figure 1, for the purpose of keeping the amplitudes of the A and B pulses substantially alike at the receiver output, thus facilitating the A and B pulse alignment. The gain control circuit includes a resistor 343 connected between the anodes of the two tubes of the last multivibrator in the final divider 17 (Figures 1 and 2). An adjustable differential gain balance tap on resistor 343 may be moved to either side of the center thereof to decrease the gain of the R.-F. amplifier 361 during either the reception of the pulse A or the pulse B. The voltage at the gain balance tap is supplied through a lead 340, a capacitor 344 and a resistor 346 to the anode of a diode 347 and to the #2 and #3 contact points of a differential gain control switch 348. Thus, when the receiver is on either the #2 or #3 operation position for pulse alignment on the fast-sweeps, the differential gain control voltage is applied through the switch 348 and a conductor 349 to the gain control grid of an amplifier tube in the R.-F. amplifier 361.

The differential gain control operation with the receiver on either #2 or #3 operation position is as follows:

When the gain balance tap is at the center of resistor 343, no voltage wave is applied to the diode 347. When the tap is on one side of this center or balance position, a wave of one polarity is applied to the diode 347; when the tap is on the other side of the balance point, a wave of the opposite polarity is applied to the diode 347. The diode 347 functions to supply a negative bias during the negative half-cycle following a positive cycle of an applied wave. For example, a positive half-cycle causes diode current to charge capacitor 344, and during the following negative half-cycle the capacitor 344 discharges slowly through a resistor 351 connected across the diode 347 thus making the anode of diode 347 negative with respect to ground and reducing the gain of the R.-F. amplifier 361 while the B pulse (or the A pulse) is being amplified.

With switch 348 on the #1 operation position for pulse alignment, normal operating bias voltage —V is on the R.-F. amplifier 361.

DETAILED DESCRIPTION OF COUNTER CHAIN AND SWITCHING OF FIGURES 2 AND 3

A more detailed description will now be given describing the system of counters, switches and gates for obtaining pulses of the desired repetition rate and of the desired delay. The specific system shown in Figures 2 and 3 provides eight different repetition rates of 40,000 $\mu$s; 39,900 $\mu$s; 39,800 $\mu$s. etc. for selecting any one of eight pairs of stations according to the settings of switches S2R, S3R, etc. As to the pulse delay, this particular system delays a pulse from 0$\mu$s to over 19,000 $\mu$s according to the settings of switches 1D, S2D, S3D, etc.

Referring to Figures 2 and 3, the chain of counters, the repetition rate switching, the delay switching, and the gating or coincidence circuits are shown in detail by way of example. The first decade counter, which is identified as counter No. 2 to facilitate comparison with the above-mentioned Woodward application, consists of multivibrator-like locking stages comprising double triodes V1, V2, V3 and V4. These stages each have two positions of rest at one or the other of which they stay locked, when tripped thereto, until some applied voltage or current trips them again to lock them in the other position. In the embodiment shown, application of negative voltage to the anodes and thence to the grids of the locking circuit tubes will reduce current in that tube drawing current and start the tripping action which switches the current through the other tube. Decade counters No. 3 and No. 4 are similar and to simplify the diagram have been illustrated by rectangles. The frequency divider or counter No. 5 is illustrated in detail and comprises only two multivibrators M1 and M2 since it divides by 4. The multivibrators in this counter are similar to those employed in the decade counters. However, the first stage M1 is the final stage of the counter chain. The second stage M2 has no reset pulse applied to it and it does not supply any pulse to the coincidence tube of the repetition rate system as will be apparent from the following description.

The repetition rate switching

Associated with each decade counter is a three-pole, ten-position switch (Figure 3) for determining the pulse repetition rate. These switches are referred to as S2R, S3R, and S4R. While ten switch positions are shown for clearness of explanation, not all of them are useful in selecting the eight stations in the example described. There is also a single-pole two-point switch S5R for the binary counter M1.

The switches S2R, S3R, S4R, and S5R and the contacts thereof are coupled to the anodes of the locking circuit tubes whereat the potentials rise and fall depending on which tube of the pair is drawing current. For example, the anode V1A of the left-hand or A section of the tube V1 is connected to alternate contacts of pole P1 of the three-pole switch S2R. The anode V1B of the right-hand or B section of tube V1 is connected to the remaining contacts of this pole. The anodes V2A, V2B, and V3B of tubes V2 and V3 are connected to staggered pairs of contacts of the second pole P2, etc. The basic details of each decade and how it operates is covered fully in Grosdoff application Serial No. 580,446, referred to above and consequently, no detailed explanation will be given here. Associated with the binary M1 of counter No. 5 is the single-pole two-position switch S5R that functions with switches S2R, S3R, etc. for determining the repetition rate. Although not so illustrated, the switches S2R, S3R, etc. preferably are ganged so as to be operated by a single station selection knob.

The basic purpose of the counter circuit is to produce output pulses after the counters have counted a predetermined number of master oscillator cycles or pulses. The start of the counting is controlled by a gate circuit No. 1 (Figure 1) and comprising tubes 27, 28, 29, 30, and 34 (Figure 3) as will be explained later. The development of the counter chain output pulses that are to be produced after the predetermined count has been reached is obtained by combining the proper voltages from the anodes of certain tubes in all four counters. For example, to select station L1 the repetition period of the last multivibrator M2 of counter No. 5 is made 39,900 microseconds. Since the first stage M1 of counter No. 5 is the final one in the counter chain to be reset, as explained hereinafter, the desired result is obtained by making the repetition period of its output wave D (Figure 5) one half the said period of 39,900 μs or 19,950 μs. Therefore the switch S2R on counter No. 2 is set on position 5 which is the tens count, switch S3R on counter No. 3 is set on position 9 which is the hundreds count, switch S4R on counter No. 4 is set on position 9 which is the thousands count, and switch S5R on counter No. 5 is set on position 1 which is the ten thousands count.

The voltage pulses collected by the switches are combined by means of five vacuum triodes 27, 28, 29, and 30. The tubes are in conventional circuits including grid leak resistances BR connecting the switches to ground. Each triode is biased by means of a voltage drop across a by-passed cathode resistor. This combination of pulses is obtained by the connections of said switches to the control grids of these four tubes. The anodes of the tubes are connected together to produce a single pulse, which represents the sum of the collected pulses, and feeds the same by way of resistors 37, 38, 39 and 41 and common resistor 42a to the grid 33 of a final combining or coincidence tube 34. The tube 34 is connected in an amplifier stage with its grid grounded by a resistor 45 and its cathode grounded by a resistor 46 and its anode connected to the plus terminal of a direct current source. The anode of amplifier tube 34 is coupled by a capacitor 47 to the control grid 48 of an output or reset pulse generator tube 49, the purpose of which is to deliver the combined or output pulse to all of the tubes in all of the decade counters and to the tubes in the binary counter M1 to trip the same back to their starting position for successive operation of the counter chain and also to deliver a pulse of the desired repetition rate to the slow sweep generator by way of the lead 61a. A negative bias voltage is applied to the grid 48 of tube 49 through a resistor 45a.

Referring to decade counter No. 2 which has its switch S2R set at position 5, it is noted that for each position of the switch, a different combination of voltages from the eight tubes of the counter are used as explained in the Grosdoff application Serial No. 580,446. The voltage on the switch S2R as applied to the grid of tube 27 reaches a certain maximum positive value only when the count is at the value for which the switch position is set and the final desired output pulse applied to the grid of tube 34 is obtained only when the proper combination of voltages occurs simultaneously on the selected tubes of all four counters. For example, in decade counter No. 2 on the count of 5, the voltages selected by switch S2R are those at the anodes of tubes V1B and V3B and V4A. This combination of three voltages raises the control grid of tube 27 above its cut-off point so that conduction is initiated in tube 27 and the potential on its anode and at resistor 37 falls. The procedure for selecting voltages by the switches will be understood by referring to the graphs of Figure 6.

Figure 6:
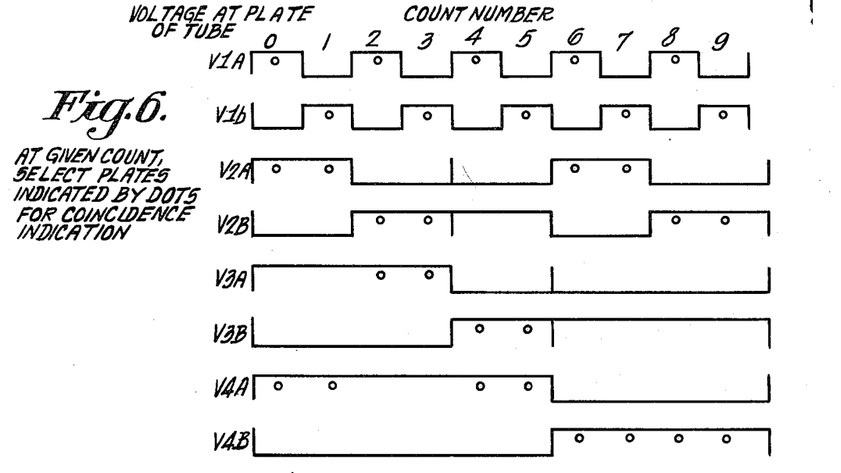
Figure 6 is a group of graphs which are referred to in explaining the operation of the counter system shown in Figures 1, 2 and 3.

The several graphs of Figure 6 show the voltages appearing at the several anodes of the tubes V1, V2, etc. The graph identified as V1A shows the voltage on the anode of the left-hand or A section of tube V1A, for example. The dissymmetrical characteristic of the graphs for the tubes V2 and V3 results from the feedback employed to obtain a decade count as explained in Grosdoff application Serial No. 580,446. The dots indicate the plates that are selected to obtain a given count. For example, the anodes V1A, V2A, and V4A are connected to switch points 0 to obtain the count 0 when the switch is set on said points 0. A similar action takes place in tubes 28, 29 and 30 when the proper voltages are obtained by the settings on switches S3R, S4R, and S5R. When the final pulse which represents the final combination of voltages from the tubes 27, 28, 29, and 30 is reached, the voltage applied to the control grid of tube 34 is reduced (negative) to such a point that conduction in the tube 34 is cut-off. This action occurs suddenly at the instant the counters of the counter chain reach the number or count for which the switches have been set. Also the tubes 27, 28, and 29 may be made conductive several times during the process of the count, yet the combined voltage applied to the grid of tube 34 is never sufficiently negative to cut this tube off until the time occurs when tubes 27, 28, 29 and 30 are simultaneously conductive, this point being when the counter chain has reached the predetermined count for which it is adjusted.

At the instant when the counter chain produces its output pulse at the plate of tube 34, this output pulse is applied to the pulse generator tube 49 which preferably is a vapor tube such as a Thyratron so that a large current output is obtained at the output terminal 51 of the load resistor 46a. Preferably, the tube 49 discharges a capacitor 49a which receives a charge from the B+ source through a resistor 49b. Thus a high energy output pulse is produced. From terminal 51 the pulse is applied by way of condenser 52 and lead 42 to reset the counters of the counter chain back to the zero or starting position. This resetting function is accomplished by application of the output pulse, which is positive in polarity, to the grid circuits of all the tubes in the counters which draw current in the starting position. As previously stated, the reset pulse is not applied to the multivibrator M2 of the frequency divider 17.

The reason for not applying a reset pulse to the multivibrator M2 is that it must supply a symmetrical square wave (wave C in Figure 5) just as in the case of the Eccles-Jordan oscillator shown in Minneman application Serial No. 744,239, now Patent 2,515,464 issued July 18, 1950. Furthermore, there is no necessity for applying a reset pulse to this last multivibrator for changing the repetition period. This will be understood from the following.

If the desired repetition period of the wave C (Figure 5) from the last multivibrator M2 is to be 39,900 μs, it is only necessary to make the repetition period of the wave D (Figure 5) from the preceding multivibrator M1 19,950 μs since the last multivibrator divides by 2. This, of course, is accomplished by the resetting action described. Similarly, for any other repetition period, the switches S2R, S3R, etc. are set to give the desired repetition period for the output wave D of the first multivibrator M1 of counter No. 5, which repetition period is one-half that of the output wave C. For the particular example assumed, the different switch settings for selecting eight different pairs of stations L0, L1, L2 etc. may be charted as follows:

*Repetition rate switching*

| STATION | L0 | L1 | L2 | L3 | L4 | L5 | L6 | L7 |
|---|---|---|---|---|---|---|---|---|
| Repetition Rate | 20,000 | 19,950 | 19,900 | 19,850 | 19,800 | 19,750 | 19,700 | 19,650 |
| S2R | 0 | 5 | 0 | 5 | 0 | 5 | 0 | 5 |
| S3R | 0 | 9 | 9 | 8 | 8 | 7 | 7 | 6 |
| S4R | 0 | 9 | 9 | 9 | 9 | 9 | 9 | 9 |
| S5R | 2 | 1 | 1 | 1 | 1 | 1 | 1 | 1 |

*The delay switching*

The delay switches S2D, S3D, S4D, and S5D are similar to the switches illustrated for determining the repetition period and they are connected to the chain of counters in the same way. The voltages taken off the delay switches are supplied to vacuum tubes 57, 58, 59, and 60 which comprise the gate circuit No. 2 (Figure 1). These tubes and their associated circuits correspond to the tubes 27, 28, 29, and 30 and their associated circuits previously described.

The coincidence tube 61 (to which the outputs of tubes 57 to 60 are applied) and the Thyratron tube 62 correspond to the tubes 34 and 49, respectively, of the repetition rate switching circuit. Delayed pulses appear on the lead 119.

The setting of switch S2D determines the delay in tens, and the settings of switches S3D, S4D, and S5D determine the delay in hundreds, thousands, and tens of thousands, respectively. For example, if the delay switches S2D, S3D, S4D, and S5D are on positions 5, 7, 6, and 0, respectively, as illustrated, when pulse alignment on the cathode-ray tube screen is obtained, then the reading from these switches is 6750 microseconds, there being no microsecond unit reading so that the last figure is zero. For convenience in setting the delay switches S2D, S3D, etc., their ganged switch arms preferably are operated by rotatable knobs 2D, 3D, etc. which carry pointers that indicate the delay setting.

To determine the delay in one microsecond units the pulses from the tube 62 (delayed to within nine microseconds or less short of the desired delay) are applied by way of lead 119 to the delay line DL which provides a delay of one microsecond per section. The line DL may be of the conventional π section type suitably terminated in a resistor TR to make it non-reflecting.

Taps are taken off the input end of the line DL and off the end of each section and connected to the switch contact points of the switch 1D. The contact points are numbered 0 to 9 to indicate microsecond units. The final delayed pulse is taken off the switch arm of switch 1D by the lead 119A.

It will be apparent that with the switches 1D to 5D on positions 8, 5, 7, 6, and 0 as illustrated, the pulse appearing on lead 119A is delayed 6758 microseconds, the unit reading being obtained by means of delay line DL.

This reading of 6758 microseconds locates one of the navigation or "loran" lines of position on the map prepared for use with the equipment.

Instead of tapping a delay line or network, a pick-up electrode may be associated with the delay line so that it has capacity to different points in the network as the electrode is moved.

The present invention is not limited to the use of a particular kind of delay network or delay means or to any particular way of taking the delayed pulses off the delay network.

While the use of an electrical delay line is preferred because of its reliability and simplicity, other suitable delay means are well known in the art. There may be mentioned, by way of example, delay multivibrators and phantastron delay means.

It should be understood that the steps of delay in the delay means are not limited to one microsecond steps nor is the total delay provided by the delay means limited to nine microseconds.

As an example of another suitable design, the delay line DL might have 19 sections of one microsecond delay each to provide delay steps of one microsecond. In this example the oscillator 10 would operate at 50 kilocycles per second and the counter 13 would divide by 5. The delay switch 2D would then give delay in steps of 20 microseconds. To obtain the proper repetition rates with this arrangement a delay line to give a delay of 10 microseconds may be put in the output circuit of the gate circuit No. 1 and provided with switching so that the 10 microsecond delay is switched in whenever the switch S2R is switched to 5, i. e. to its position for stations L1, L2, etc.

It will be noted that since the last counter stage supplying pulses to the gate tube 60 is the binary M1, the coincidence tube 61 would supply output pulses of a repetition period of 20,000 μs or less, depending on the selected repetition period, in the absence of some further circuit action. Double this repetition period is desired, of course, for driving the fast-sweep circuit to obtain the adjustable fast trace $f$—$g$ (Figure 5). The desired repetition period is obtained by, in effect, blanking out alternate pulses as indicated in Figure 5 so that only the 40,000 μs repetition period pulse U appears on the lead 119 and, therefore, on the lead 119A.

This blanking effect is obtained by applying to the grid of gate tube 60 by way of a lead 70 a square wave from the last multivibrator M2. This wave is the same as wave C (Figure 5) except that it is of the opposite polarity, being taken off the opposite side of M2 from the side supplying the wave C. Thus, the grid of tube 60 is held negative during the "master period" (see Figure 5) whereby the pulse from the binary M1 cannot pass through tube 60 during said period.

The amount a pulse is delay is not affected by changes in the pulse repetition rate because the amount of delay is less than the shortest repetition period. In the present example, the maximum delay desired from the point of measurement (mid-point $d$, Figure 5) is less than 19,650 μs which is the shortest repetition period of the wave D. The resetting action is the only thing that would affect the delay and this does not occur until the counters have operated for more than the desired period of delay without any loss of count due to resetting.

The delay switch settings obviously do not affect the repetition rate since they do not affect the resetting circuit.

It will be apparent that the system of counters, switches, gate tubes, coincidence tubes and delay line described herein for obtaining pulses of selected repetition rates and selected delays is of general application and is not limited to its use in navigation apparatus. For general application it probably would be desired to omit the lead 70 so that there would be no blanking action. In that case the output pulse on lead 119A would have a repetition period of 20,000 μs or less as desired and the amount of the delay would be measured from the time of occurrence of any reset pulse, not just from the reset pulse occurring at the midpoint $d$ as in the navigation system application.

From the foregoing description, it will be understood that we have provided an improved navigation apparatus of great accuracy that determines time intervals or differences that are easily read by an operator; that we have also provided a system of counters and switching of general application which supplies pulses that may be adjusted to any one of a wide range of repetition periods, with the pulses of a selected repetition period delayed with great precision any desired amount over a wide operating range; and that we have provided a system that produces pulses delayed in one microsecond steps or intervals while avoiding the difficulties encountered in operating a one megacycle counter in combination with coincident circuits.

PROCEDURE IN MAKING A TIME MEASUREMENT

The successive steps in making a measurement of the time interval between the A and B pulses from a pair of ground stations will now be described.

Alignment of A and B pulses

*Position #1.*—After a particular pair of ground stations has been selected with the receiver set on the #1 operation position of the function switches, the A and B pulses will appear stationary on the two traces $a$—$b$ and $c$—$d$. A suitable drift switch such as knob 11 of oscillator 10 is operated to drift one of the pulses onto the upper trace $c$—$d$ and over the fixed index marker at the left end of this trace. The other pulse will now appear on the lower trace $a$—$b$. The pulse on the trace $c$—$d$ is the A pulse and the pulse on the trace $a$—$b$ is the B pulse. That this is true will be evident by referring to the graphs of Figure 5.

Next, the starting time $t$ of the variable index marker of wave V is adjusted by setting the delay switch knobs 1D, 2D, etc. to bring the variable index marker under the B pulse. The variable index marker is now carefully adjusted so that its position with respect to the B pulse is substantially the same as the position of the fixed index marker with respect to the A pulse.

*Position #2.*—Next, referring to Figure 8, the receiver is switched by the function switches to the fast-sweep operation position #2 which results in the A and B pulses appearing on the traces $h$—$i$ and $f$—$g$, respectively. As shown in Figure 5, the start of the variable index marker pulse of wave V determines the start of the second fast-sweep portion $f$—$g$ of wave W, the two starting practically simultaneously. By operating suitable drift switches such as the knob 11 of the crystal oscillator 10, the A and B pulses are drifted to the left ends of the traces where they are on the more expanded portion of the fast-sweeps. They are then closely aligned as shown in Figure 8 by operating one or more of the delay switch knobs 1D, 2D, etc.

*Position #3.*—The final alignment of the A and B pulses is done on operation position #3 with the two traces $f$—$g$ and $h$—$i$ superimposed as shown in Figure 9. The front edges of the A and B pulses are now exactly aligned, usually by operating only the switch knob 1D. The time reading can now be made from the settings of the delay switch knobs as shown by the positions of the pointers on the knobs 1D, 2D, 3D, 4D, and 5D.

For example, if the pointers of the switch knobs 1D, 2D, 3D, 4D, and 5D read 8, 5, 7, 6, and 0, respectively, the reading is 6758 microseconds.

We claim as our invention:

1. Apparatus for determining the time interval between two time-spaced pulses, said apparatus including a pulse coincidence indicator for indicating visual coincidence of said two time-spaced pulses applied thereto, a chain of counters for producing an adjustably-delayed pulse, means comprising count-selecting means connected to said chain of counters for determining the amount of delay of said delayed pulse, a delay means, means for applying said delayed pulse to said delay means, means for obtaining from said delay means a pulse that is further delayed a selected amount by said delay means, means for applying said further delayed pulse to said coincidence indicator for bringing said two time-spaced pulses into visual coincidence, and means for indicating said time interval as a function of the adjustments of said count-selecting means and said delay means.

2. Apparatus for determining the time interval between two time-spaced pulses, said apparatus including a pulse coincidence indicator for indicating coincidence of said two time-spaced pulses, a chain of counters for producing an adjustably-delayed pulse, means comprising count-selecting means connected to said chain of counters for determining the amount of delay of said delayed pulse, a delay line, means for applying said delayed pulse to said delay line, delay line switching means for taking said delayed pulse off selected points along said delay line to obtain a pulse that is further delayed a selected amount by said delay line, means for applying said further delayed pulse to said coincidence indicator for bringing said two time-spaced pulses into coincidence, and means for indicating said time interval as a function of the adjustments of said count-selecting means and said delay line switching means.

3. In a navigation system receiver for receiving two time-spaced pulses that are transmitted in a predetermined time relation from two geographically-spaced stations, respectively, said receiver including a pulse coincidence indicator for indicating coincidence of said two time-spaced pulses, a chain of counters for producing an adjustably-delayed pulse, means comprising count-selecting means connected to said chain of counters for determining the amount of delay of said delayed pulse, a delay means, means for applying said delayed pulse to said delay means, means for obtaining from said delay means a pulse that is further delayed a selected amount by said delay means, means for applying said further delayed pulse to said coincidence indicator for bringing said two time-spaced pulses into coincidence, and means for indicating a navigation line of position as a function of the adjustments of said count-selecting means and said delay line switching means when coincidence of said time-spaced pulse is obtained at said indicator.

4. The invention according to claim 3 wherein there is means for supplying to the input end of said chain of counters a signal having a certain repetition period, and wherein said delay means provides increments of delay that are smaller than said certain repetition period.

5. In a navigation system receiver for receiving two time-spaced pulses that are transmitted in a predetermined time relation from two geographically-spaced stations, respectively, said receiver including a pulse coincidence indicator for indicating coincidence of said two time-spaced pulses, a chain of counters for producing an adjustably-delayed pulse, means comprising count-selecting means connected to said chain of counters for determining the amount of delay of said delayed pulse, a delay line, means for applying said delayed pulse to said delay line, delay line switching means for taking said delayed pulse off selected points along said delay line to obtain a pulse that is further delayed a selected amount by said delay line, means for applying said further delayed pulse to said coincidence indicator for bringing said two time-spaced pulses into coincidence, and means for indicating a navigation line of position as a function of the adjustments of said count-selecting means and said delay line switching means when coincidence of said time-spaced pulse is obtained at said indicator.

6. In combination, a chain of counters, means comprising count-selecting means connected to each of said counters for obtaining output pulses and for determining the repetition rate of said output pulses, said repetition rate determining means also including means for resetting said counters by said output pulses and at the same time restarting the cycle of operation of the counter chain, additional means comprising additional count-selecting means connected to each of said counters for obtaining other output pulses of said repetition rate and for determining the delay of said other output pulses with respect to the start of said cycle, a delay means, means for applying said other output pulses to said delay means, means for obtaining from said delay means pulses that are further delayed a selected amount by said delay means.

7. The invention according to claim 6 wherein there is means for supplying to the input end of said chain of counters a signal having a certain repetition period, and wherein said delay means provides increments of delay that are smaller than said certain repetition period.

8. In combination, a chain of counters, means comprising count-selecting means connected to each of said counters for obtaining output pulses and for determining the repetition rate of said output pulses, said repetition rate determining means also including means for resetting said counters by said output pulses and at the same time restarting the cycle of operation of the counter chain, additional means comprising additional count-selecting means connected to each of said counters for obtaining other output pulses of said repetition rate and for determining the delay of said other output pulses with respect to the start of said cycle, a tapped delay line, means for applying said other output pulses to said delay line, delay line switching means for taking said other output pulses off selected tapped points along said delay line to obtain pulses that are further delayed a selected amount by said delay line.

9. In combination, a chain of counters, a stable oscillator connected to supply signal continuously to the high frequency end of said chain of counters, means comprising count-selecting means connected to each of said counters for obtaining output pulses and for determining the repetition rate of said output pulses, said repetition rate determining means also including means for resetting said counters by said output pulses and at the same time restarting the cycle of operation of the counter chain, and additional means comprising additional count-selecting means connected to each of said counters for obtaining other output pulses of said repetition rate and for determining the delay of said other output pulses with respect to the start of said cycle, a delay means, means for applying said other output pulses to said delay means, means for obtaining from said delay means pulses that are further delayed a selected amount by said delay means.

10. The invention according to claim 9 wherein said delay means provides increments of delay that are smaller than the repetition period of the signal supplied by said oscillator.

11. In combination, a chain of counters, a stable oscillator connected to supply signal continuously to the high frequency end of said chain of counters, means comprising count-selecting means connected to each of said counters for obtaining output pulses and for determining the repetition rate of said output pulses, said repetition rate determining means also including means for resetting said counters by said output pulses and at the same time restarting the cycle of operation of the counter chain, and additional means comprising additional count-selecting means connected to each of said counters for obtaining other output pulses of said repetition rate and for determining the delay of said other output pulses with respect to the start of said cycle, a tapped delay line, means for applying said other output pulses to said delay line, delay line switching means for taking said other output pulses off selected tapped points along said delay line to obtain pulses that are further delayed a selected amount by said delay line.

12. In combination, a stable oscillator operating at 100 kilocycles per second for supplying signal at a comparatively high frequency, a chain of counters, means for supplying said signal to the high frequency end of said chain of counters, each counter having a count-selecting means, a coincidence tube or circuit, said selected counts from the counters of said chain being applied to said coincidence tube whereby it passes an output pulse only in response to the selected counts from each counter occurring simultaneously, means for resetting said counters by said output pulse and at the same time restarting the cycle of operation of the counter chain whereby the repetition rate of said output pulse is determined by the count selection at each of the counters; each counter of said chain having an additional count-selecting means, a second coincidence tube or circuit, the counts selected by said additional count-selecting means being applied to said second coincidence tube whereby it passes an output pulse only in response to the selected counts from each counter applied thereto occurring simultaneously and whereby said second output pulse has a delay determined by the count selection of said additional count-selecting means and a repetition rate determined by the count selection of said first count-selecting means, a delay means, means for applying said other output pulses to said delay means, means for obtaining from said delay means pulses that are further delayed a selected amount by said delay means.

13. In combination, a stable oscillator operating at 100 kilocycles per second for supplying signal at a comparatively high frequency, a chain of counters, means for supplying said signal to the high frequency end of said chain of counters, each counter having a count-selecting means, a coincidence tube or circuit, said selected counts from the counters of said chain being applied to said coincidence tube whereby it passes an output pulse only in response to the selected counts from each counter occurring simultaneously, means for resetting said counters by said output pulse and at the same time restarting the cycle of operation of the counter chain whereby the repetition rate of said output pulse is determined by the count selection at each of the counters; each counter of said chain having an additional count-selecting means, a second coincidence tube or circuit, the counts selected by said additional count-selecting means being applied to said second coincidence tube whereby it passes an output pulse only in response to the selected counts from each counter applied thereto occurring simultaneously and whereby said second output pulse has a delay determined by the count selection of said additional count-selecting means and a repetition rate determined by the count selection of said first count-selecting means, a delay line that is tapped to provide delays in increments of one microsecond, means for applying said other output pulses to said delay line, delay line switching means for taking said other output pulses off selected tapped points along said delay line to obtain pulses that are further delayed a selected amount by said delay line.

HOWARD C. LAWRENCE, JR.
ROBERT R. FREAS, JR.

No references cited.